(12) United States Patent
Wooldridge et al.

(10) Patent No.: US 6,564,892 B2
(45) Date of Patent: May 20, 2003

(54) L-BRACKET MODULAR FRONT ENGINE MOUNTING

(75) Inventors: Scott A. Wooldridge, Fort Wayne, IN (US); William G. Pollack, Jr., Auburn, IN (US); Ronald C. Schroeder, Fort Wayne, IN (US)

(73) Assignee: International Truck Intellectual Property Company, LLC., Warrenville, IL (US)

( * ) Notice: Subject to any disclaimer, the term of this patent is extended or adjusted under 35 U.S.C. 154(b) by 0 days.

(21) Appl. No.: 09/879,352

(22) Filed: Jun. 12, 2001

(65) Prior Publication Data

US 2002/0020572 A1 Feb. 21, 2002

Related U.S. Application Data

(60) Provisional application No. 60/211,144, filed on Jun. 13, 2000.

(51) Int. Cl.$^7$ .............................................. B60D 21/03
(52) U.S. Cl. ........................ 180/68.4; 180/300; 280/795
(58) Field of Search ................................. 180/68.1, 68.4, 180/291, 299, 300, 68.6; 165/67, 69; 280/781, 795, 800

(56) References Cited

U.S. PATENT DOCUMENTS

| | | | | |
|---|---|---|---|---|
| 4,263,980 A | * | 4/1981 | Harlow et al. | 180/292 |
| 4,538,697 A | * | 9/1985 | Muroi et al. | 180/300 |
| 4,822,096 A | * | 4/1989 | Fujii | 280/781 |
| 5,078,230 A | * | 1/1992 | Hasuike | 180/291 |
| 5,088,572 A | * | 2/1992 | Schroeder et al. | 180/300 |
| 5,271,473 A | * | 12/1993 | Ikeda et al. | 180/68.4 |
| 5,597,047 A | * | 1/1997 | Thompson et al. | 180/68.4 |
| 5,701,969 A | * | 12/1997 | Stephens | 180/299 |
| 5,882,039 A | * | 3/1999 | Beckman et al. | 180/311 |
| 6,189,930 B1 | * | 2/2001 | Kalazny | 280/781 |
| 6,412,581 B2 | * | 7/2002 | Enomoto et al. | 180/68.4 |

FOREIGN PATENT DOCUMENTS

JP           06191434 A    *   7/1994   ........... B62D/21/00

* cited by examiner

*Primary Examiner*—Brian L. Johnson
*Assistant Examiner*—Kelly E Campbell
(74) *Attorney, Agent, or Firm*—Jeffrey P. Calfa; Neil T. Powell; Dennis Kelly Sullivan

(57) ABSTRACT

An engine or radiator mounting sub-system comprised generally of an engine or radiator frame cross piece that is assembled to the engine or radiator off of the assembly line of a mobile vehicle. The off-line assembly allows the engine mounts to be preloaded prior to assembly. The engine or radiator and frame cross piece module may be lowered into the chassis on an assembly line for final fastener engagement that comes through the side or top of the frame rails. In one embodiment, the frame cross piece has an end bracket on each end that allows the lowering in of the engine or radiator into exact forward and aft placement on the respective frame rails. There may be frame rail brackets that have 'L' shaped ends. Where these 'L' brackets are used, the length of the frame cross piece including the 'L' brackets out to the outer vertical face will closely approximate the width between the rails. During vehicle manufacture, the frame crosspiece would be installed to the engine or radiator. The engine or radiator and frame cross piece combination would be moved to the chassis on an assembly line. The horizontal portion of the 'L' brackets will rest on the upper surfaces of the frame rail. The final engagement or bolt up would occur to and through the top and or side of the frame rails.

15 Claims, 5 Drawing Sheets

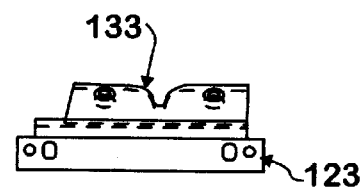
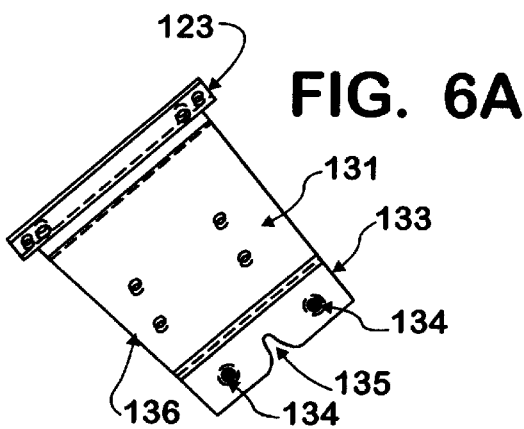
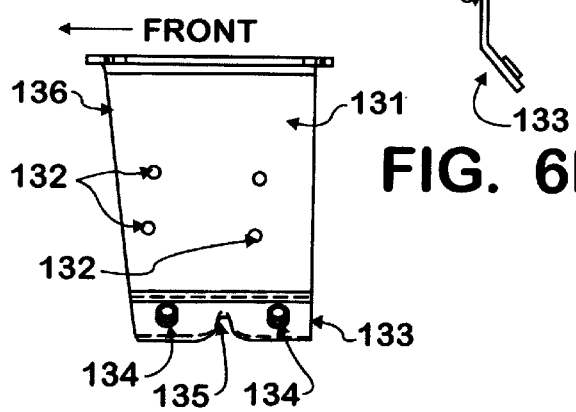
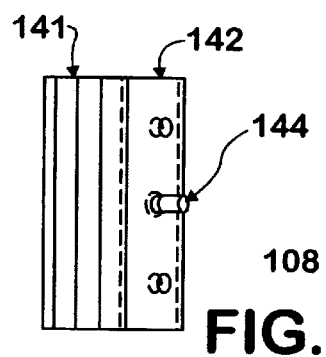
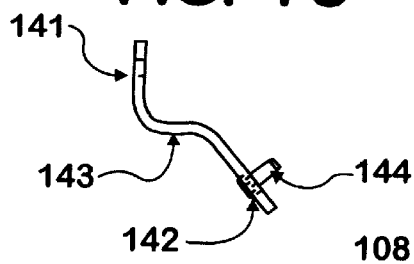
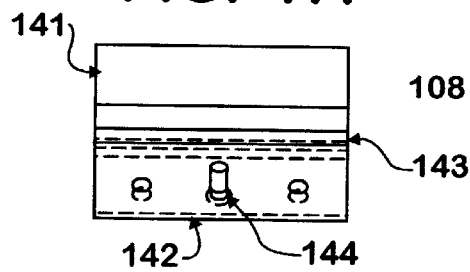

L-BRACKET MODULAR FRONT ENGINE MOUNTING

This is a non-provisional patent application claiming priority of provisional patent application Ser. No. 60/211,144, filed Jun. 13, 2000.

BACKGROUND

This invention relates to mounting a radiator or engine module or a radiator and engine module into a mobile vehicle chassis without assembly requirements under the chassis. The module may be assembled separate from an assembly line and dropped directly into place in the chassis. Such vehicles appropriate for such installation include light, medium, and heavy duty trucks.

PRIOR ART

In the prior art, engines and radiators were installed on vehicle chassis on an assembly line. The engine or radiator was moved into place manually or using a crane or lift. The engine or radiator was engaged to the chassis components from both above and below the frame rails of the chassis. The chassis contains two roughly parallel frame rails. The engine or radiator were engaged to engagement brackets on the frame rails by work which took place both above and below the frame rails. This increased the time and complexity of on assembly line installation.

SUMMARY

An object of the invention is to provide a mounting arrangement for an engine or a radiator to a chassis that may be assembled off line and then easily lowered into place on a vehicle chassis. A second object of the invention provides a mounting arrangement for an engine or a radiator that allows for accurate less complex installation on a chassis.

The engine or radiator mounting arrangement and process of installation of this invention satisfies all the objects of the invention and others not mentioned. The engine or radiator mounting arrangement is comprised generally of an engine or radiator frame cross piece that is assembled to the engine or radiator off of the assembly line. The off-line assembly allows the engine mounts to be preloaded prior to assembly. The engine or radiator and frame cross piece module may be lowered into the chassis on an assembly line for final fastener engagement that comes through the side or top of the frame rails. In one embodiment, the frame cross piece has an end bracket on each end that allows the lowering in of the engine or radiator into exact forward and aft placement on the respective frame rails. There may be frame rail brackets that have 'L' shaped ends. Where these 'L' brackets are used, the length of the frame cross piece including the 'L' brackets out to the outer vertical face will closely approximate the width between the rails. During vehicle manufacture, the frame cross piece would be installed to the engine or radiator. The engine or radiator and frame cross piece combination would be moved to the chassis on an assembly line. The horizontal portion of the 'L' brackets will rest on the upper surfaces of the frame rail. The final engagement or bolt up would occur to and through the top and or side of the frame rails.

DRAWINGS

Other objects and advantages of the invention will become more apparent upon perusal of the detailed description thereof and upon inspection of the drawings, in which:

FIG. 6A is an angled front view of a left side L-Bracket for the sub-system of FIG. 2.

FIG. 6B is a side view of the L-Bracket of FIG. 6A.

FIG. 6C is a top down view of the L-Bracket of FIG. 6A.

FIG. 6D is a front view of the L-Bracket of FIG. 6A.

FIG. 7A is top down view of a frame rail lower bracket for the sub-system of FIG. 2.

FIG. 7B is an angled downwards view of the frame rail lower bracket of FIG. 7A.

FIG. 7C is a side view of the frame rail lower bracket of FIG. 7A.

DETAILS OF INVENTION

Figure 1:
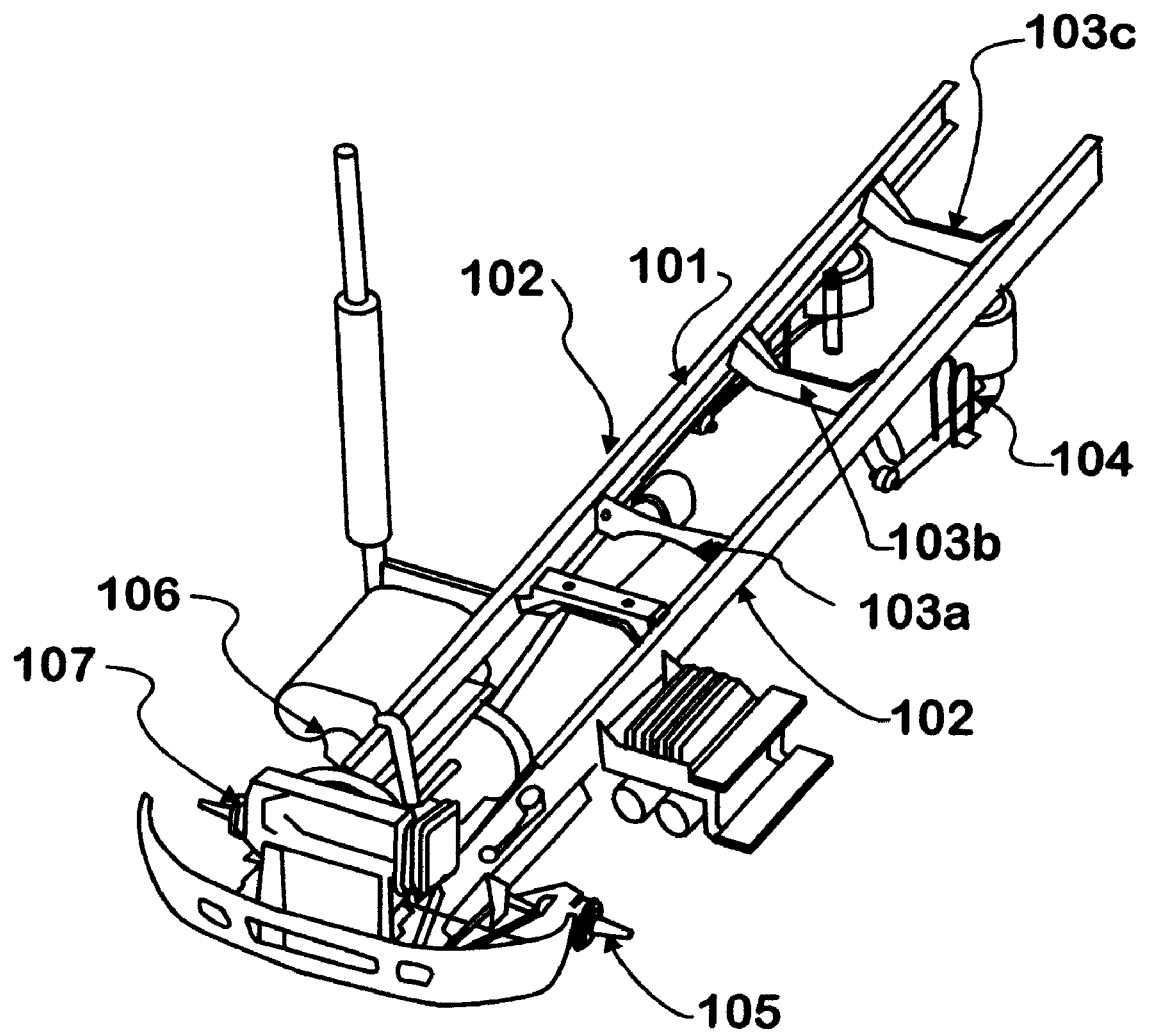
FIG. 1 is a perspective view of a chassis containing a mounting module made in accordance with this invention.
Figure 3:
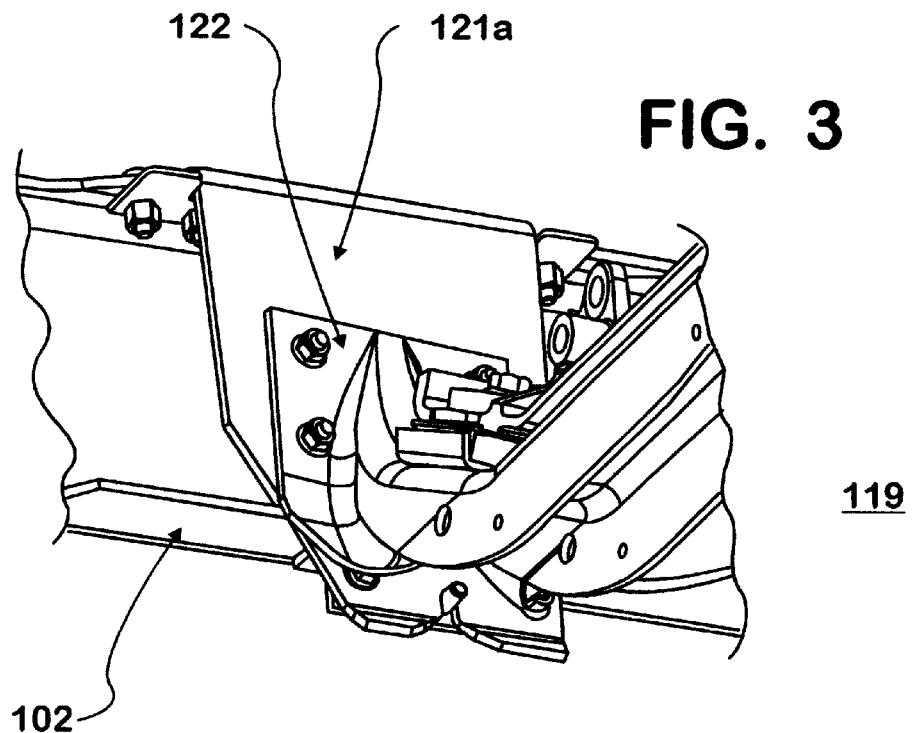
FIG. 3 is an upward looking perspective view of the mounting module of FIG. 2.
Figure 2:
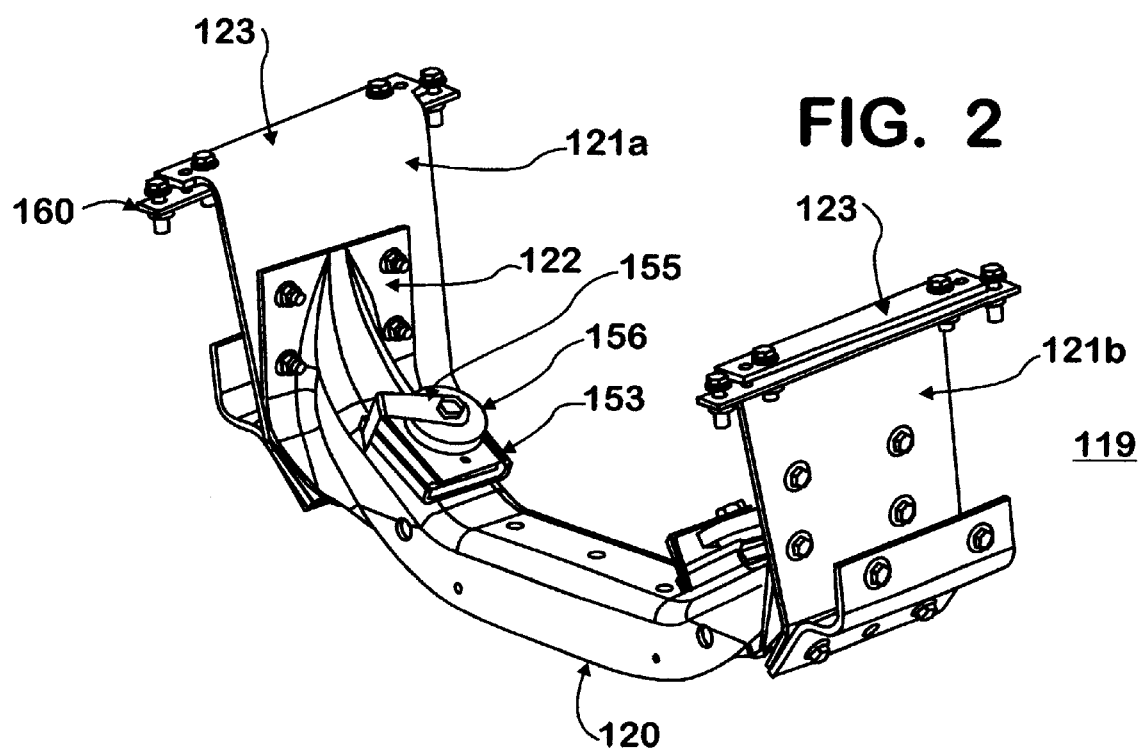
FIG. 2 is a downward looking perspective view of the mounting module of FIG. 1.
Figure 4:
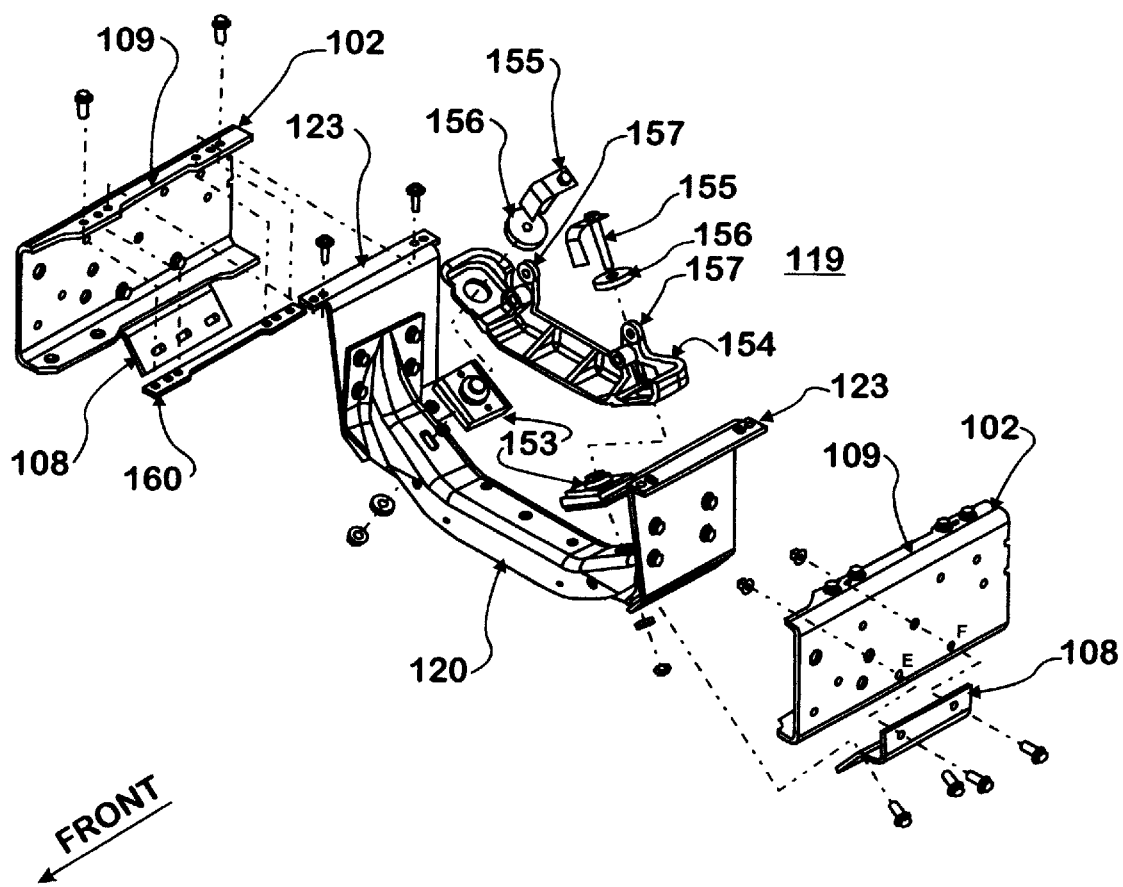
FIG. 4 is an exploded perspective view of the mounting module of FIG. 2 along with a portion of the chassis of FIG. 1.
Figure 5B:
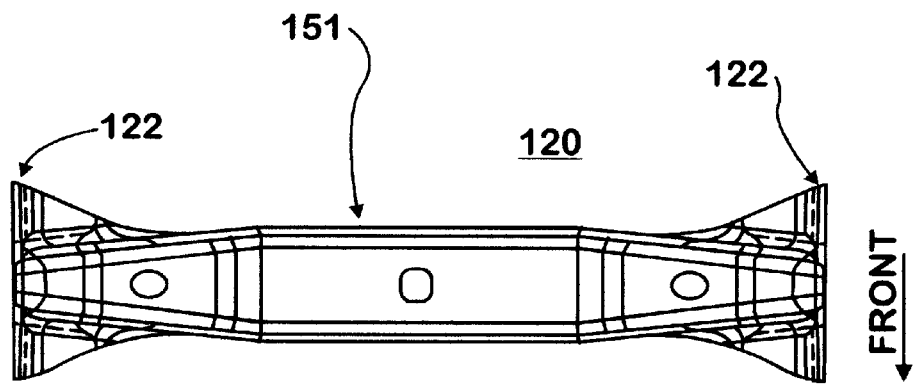
FIG. 5B is a bottom up view of the chassis cross member of FIG. 5A.
Figure 5A:
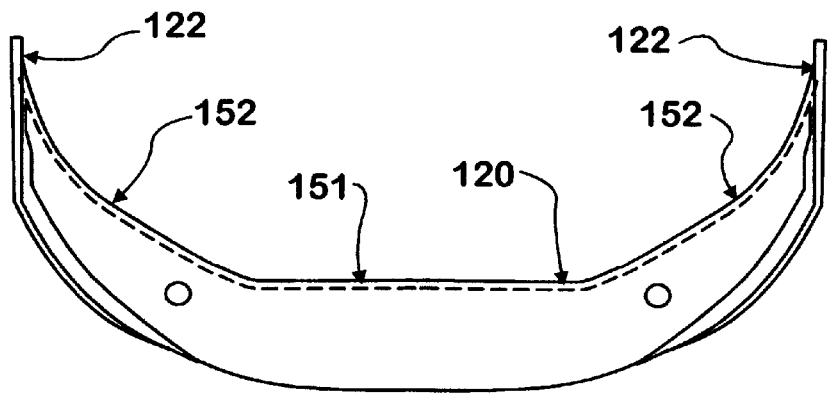
FIG. 5A is a front view of a chassis cross member portion of the mounting module of FIG. 2.
Figure 5C:
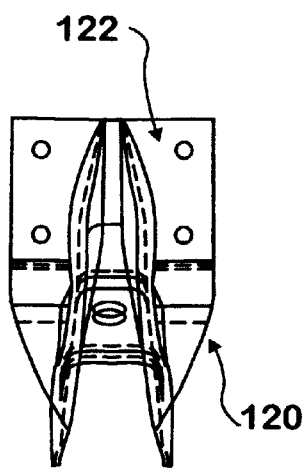
FIG. 5C is a side view of the chassis cross member of FIG. 5A.

A mobile vehicle chassis 101 is shown in FIG. 1. This chassis 101 may be used for a medium-duty or heavy-duty truck or a school or transit bus. An engine or radiator mounting subsystem 119 made in accordance with this invention is shown installed on the chassis 101 in FIG. 1 and individually and in sub-parts in FIGS. 2 to 6. The chassis 101 contains at least two frame rails 102 which are approximately parallel. The frame rails 102 are joined by chassis cross members 103a, 103b, 103c, and the mounting sub-system 119 of this invention. A rear suspension 104 is used to engage a rear axle and wheels to the frame rails 102. A front axle and front suspension 105 is engaged to front portion of the frame rails. An engine 106 or a radiator 107 may engaged to the frame rails 102 through the mounting sub-system 119.

The engine or radiator mounting sub-system 119 is comprised generally of an engine or radiator frame cross piece 120 that is assembled to the engine 106 or radiator 107 off of the assembly line for the vehicle. The off-line assembly allows the engine mounts to be preloaded prior to assembly. The engine 106 or radiator 107 in combination with the mounting sub-system 119 may be lowered as a module into the chassis 101 on an assembly line for final fastener engagement that comes through the side or top of the frame rails 102. In one embodiment, the frame cross piece has an end bracket on each end that allows the lowering in of the engine or radiator into exact forward and aft placement on the respective frame rails 102. There may be frame rail brackets 121a and 121b that have 'L' shaped ends. Where these 'L' brackets 121a and 121b are used, the length of the frame cross piece 120 including the 'L' brackets 121a and 121b out to the distal mounting end plates 122 will closely approximate the width between the rails 102. During vehicle chassis 101 manufacture, the frame crosspiece 120 would be installed to the engine 106 or radiator 107. The engine 106 or radiator 102 and frame cross piece 120 combination mounting sub-system 119 would be moved to the chassis 101 on an assembly line. The upper horizontal surfaces 123 of the 'L' brackets 121a and 121b will rest on the upper surfaces 109 of the frame rail 102. The final engagement of fasteners or bolt up would occur to and through the top and or side of the frame rails 102. There may be an upper bracket 160 for sandwiching the upper surface 109 of the frame rail 102 to the upper horizontal surfaces 123 of the 'L' brackets 121a and 121b.

The frame cross piece 120 has a horizontal center section 151 engaged to upwardly turned transition pieces 152 which allow the component to be mounted to be lower relative to the frame rails 102. There are distal mounting end mounting plates 122 engaged to each of the transition pieces 152 for engagement to the L-Brackets 121a and 121b. For radiator 107 mounting, the radiator would be engaged to the frame cross piece 120. For engine 106 mounting, a cross member mounting pad 153 is sandwiched between an engine mounting bracket 154 and the frame cross piece 120. The engine mounting bracket 154 is held to in the sandwich arrangement to the frame cross piece 120 through two flag bolts 155 and flexible washer 156 pairs. The engine mounting bracket 154 contains engine mounting bores 157 for conventional fastener engagement to a lower portion the engine 106.

The L-Brackets 121a and 121b for engagement to the left and right of the frame rails 102 also have lower lateral locators. Frame rail lower brackets 108, engaged directly to the frame rails 102, provide mating surfaces for the lower lateral locators of the L-Brackets 121a and 121b. FIGS. 6A to 6D provide individual views of the left side L-Brackets 121b, with the right side L-Bracket 121a being approximately a mirror image of the left side L-Bracket 121b. FIGS. 7A to 7C provide individual view of the frame rail lower brackets 108. As mentioned above, the upper horizontal surface or lip 123 of the L-Brackets 121a and 121b rest on the upper surface 109 of the frame rails 102 following installation. These upper horizontal surfaces 123 are integral with a vertical cross member engagement piece 131. The cross member engagement face 131 is designed to engaged to the distal mounting end plates 122 of the cross member 120. In the embodiment of the L-Bracket 121b shown in FIGS. 6A to 6D, the engagement faces contain prebored mounting holes 132 for passage of engagement fasteners to the respective distal mounting end mounting plates 122. In order for there to be lateral location of the sub-system 119 upon installation, there is a locator edge 133 integrally engaged to the cross member engagement face 131. The locator edge 133 contains either holes for passage of fasteners or weld nuts 134 for engagement of fasteners for final assembly. More importantly, for the lower lateral location to be functional, if desired, the locator edge 133 contains locator notches 135. The locator notches may be any shape with an open end to allow catching of a locator pin 144 on the frame rail lower brackets 108, however the embodiment shown in FIGS. 6A to 6B shows a locator notch 135 that has concave outwards outer portions. The concave outwards outer portions allow smooth alignment of the locator notch 135 with locator pins 144. The locator edge 133 may be on an angle to allow it to slide into engagement with the frame rail lower brackets 108 at the main chassis assembly line. Note that the pin or male element on the receiving frame rail component and the notch on the mounting sub-system or module may be reversed.

In one embodiment, a front vertical edge 136 of the cross member engagement face 131 may be on an incline to achieve fit up alignment with other chassis 101 components.

The frame rail lower brackets 108 contain a rail engagement edge 141 for conventional engagement to the frame rails 102. Where there is a lower lateral locator function, the frame rail lower brackets 108 may have a locator receiving edge 142. If the locator edge 133 of the L-Brackets 121a and 121b is on an incline, the locator receiving edge 142 of the frame lower brackets 108 will also be on a corresponding angle to allow smooth mating of the notch and pin. This smooth transition can occur even if the pin and notch mounting locations are reversed from that shown. The locator receiving edge 142, where used, will include a locator pin 144 shaped to fit within the locator notch 135 of the L-Brackets 121a and 121b. There may be a transition piece 143 between the rail engagement edge 141 and the locator receiving edge 142.

As described above, the engine or radiator mounting sub-system 119 and a vehicle chassis 101 with this sub-system installed provide a number of advantages, some of which have been described above and others of which are inherent in the invention. Also modifications may be proposed to the engine or radiator mounting sub-system 119 and a vehicle chassis 101 with this subsystem installed without departing from the teachings herein.

We claim:

1. An engine mounting sub-system for mounting an engine to a mobile vehicle chassis, the chassis having two approximately parallel frame rails with cross members between and connecting the rails, and the rails each having an upper surface, comprising:

an engine;

said engine engaged a frame cross piece;

said frame cross piece engaged to L shaped brackets at each end of said frame cross piece;

said L Brackets each having an upper horizontal surface for resting on the frame rail upper surface allowing a permanent installation on the chassis;

lower lateral locator components with a locator pin and notch pair, with said notch mating with said pin to align said frame cross piece with the frame rails;

said locator pin is engaged on a component for mounting on the frame rails and said notch for aligning with said locator pin is engaged to a frame cross piece engaged component;

said notch is located on a lower edge of each of said L Brackets;

said locator pin is engaged to a locator receiving edge of a frame rail lower bracket; and said frame rail lower brackets are engageable to a lower portion of each of the frame rails.

2. The mounting sub-system of claim 1, wherein:

said locator edge of said L-Brackets is on an incline; and said locator receiving edge of said frame rail lower brackets is on a corresponding angle to said locator.

3. The mounting sub-system of claim 2, wherein:

said notch has concave outwards portions.

4. The mounting sub-system of claim 3, wherein said engine engagement to said frame cross piece comprising:

a cross member mounting pad sandwiched between an engine mounting bracket and said frame cross piece;

said engine mounting bracket held in said sandwich arrangement to said frame cross piece through flag bolt and flexible washer pairs; and said engine mounting bracket containing engine mounting bores for fastener engagement to said engine.

5. A radiator mounting sub-system for mounting radiator to a mobile vehicle chassis, the chassis having two approximately parallel frame rails with cross members between and connecting the rails, and the rails each having an upper surface, comprising:

a radiator;

said radiator engaged a frame cross piece;

said frame crass piece engaged to L shaped brackets at each end of said frame cross piece;

said L Brackets each having an upper horizontal surface for resting on the frame rail upper surface allowing a permanent installation on the chassis;

lower lateral locator components with a locator pin and notch pair, with said notch mating with said pin to align said frame cross piece with the frame rails;

said locator pin is engaged on a component for mounting on the frame rails and said notch for aligning with said locator pin is engaged to a frame cross piece engaged component;

said notch is located on a lower edge of each of said L Brackets;

said locator pin is engaged to a locator receiving edge of a frame rail lower bracket; and said frame rail lower brackets are engageable to a lower portion of each of the frame rails.

6. The mounting sub-system of claim 5, wherein:

said locator edge of said L-Brackets is on an incline; and said locator receiving edge of said frame rail lower brackets is on a corresponding angle to said locator.

7. The mounting sub-system of claim 6, wherein:

said notch has concave outwards portions.

8. A mobile vehicle chassis in combination with an engine mounting sub-system, comprising: the, comprising:

two approximately parallel frame rails with cross members between and connecting said rails:

the rails each having an upper surface;

an engine;

said engine engaged a frame cross piece;

said frame cross piece engaged to L shaped brackets at each end of said frame cross piece;

said L Brackets each having an upper horizontal surface for resting on said frame rail upper surfaces;

lower lateral locator components with a locator pin and notch pair, with said notch mating with said pin to align said frame cross piece with said frame rails;

said locator pin is engaged on a component for mounting on the frame rails and said notch for aligning with said locator pin is engaged to a frame cross piece engaged component;

said notch is located on a lower edge of each of said L Brackets;

said locator pin is engaged to a locator receiving edge of a frame rail lower bracket; and said frame rail lower brackets are engageable to a lower portion of each of the frame rails.

9. The mounting sub-system of claim 8, wherein;

said locator edge of said L-Brackets is on an incline; and said locator receiving edge of said frame rail lower brackets is on a corresponding angle to said locator.

10. The mounting sub-system of claim 9, wherein:

said notch has concave outwards portions.

11. The mounting sub-system of claim 10, wherein said engine engagement to said frame cross piece comprising:

a cross member mounting pad sandwiched between an engine mounting bracket and said frame cross piece;

said engine mounting bracket held in said sandwich arrangement to said frame cross piece through flag bolt and flexible washer pairs; and said engine mounting bracket containing engine mounting bores for fastener engagement to said engine.

12. A mobile vehicle chassis in combination with an engine mounting sub-system, comprising:

two approximately parallel frame rails with cross members between and connecting said rails;

the rails each having an upper surface;

an engine;

said engine engaged a frame cross piece;

said frame cross piece having a horizontal center section engaged to upwardly turned transition pieces;

said transition pieces engaged to integral distal mounting end plates;

said distal mounting end plates engaged to L shaped brackets;

said L Brackets each having en upper horizontal surface for resting on said frame rail upper surfaces;

lower lateral locator components with a locator pin and notch pair, with said notch mating with said pin to align said frame cross piece with said frame rails;

said locator pin is engaged on a component for mounting on the frame rails and said notch for aligning with said locator pin is engaged to a frame cross piece engaged component;

said notch is located on a lower edge of each of said L Brackets;

said locator pin is engaged to a locator receiving edge of a frame rail lower bracket; and said frame rail lower brackets are engageable to a lower portion of each of the frame rails.

13. The vehicle chassis of claim 12, wherein:

said locator edge of said L-Brackets is on an incline; and said locator receiving edge of said frame rail lower brackets is on a corresponding angle to said locator.

14. The vehicle chassis of claim 13, wherein:

said notch has concave outwards portions.

15. The vehicle chassis of claim 14, wherein said engine engagement to said frame cross piece comprising:

a cross member mounting pad sandwiched between an engine mounting bracket and said frame cross piece;

said engine mounting bracket held in said sandwich arrangement to said frame cross piece through flag bolt and flexible washer pairs; and said engine mounting bracket containing engine mounting bores for fastener engagement to said engine.

* * * * *